United States Patent [19]
Lahm et al.

[11] Patent Number: 4,818,925
[45] Date of Patent: Apr. 4, 1989

[54] DEVICE FOR SETTING THE WORKING POINT OF A TOOL IN AN NC MACHINE TOOL

[75] Inventors: Heinrich Lahm, Mühlhausen-Ehingen; Walter Grossmann, Baltmannsweiler; Günther Schleich, Hochdorf, all of Fed. Rep. of Germany

[73] Assignee: Index-Werke KG Hahn & Tessky, Esslingen, Fed. Rep. of Germany

[21] Appl. No.: 116,714

[22] PCT Filed: Jan. 21, 1987

[86] PCT No.: PCT/DE87/00024
§ 371 Date: Sep. 25, 1987
§ 102(e) Date: Sep. 25, 1987

[87] PCT Pub. No.: WO87/04814
PCT Pub. Date: Aug. 13, 1987

[30] Foreign Application Priority Data
Feb. 4, 1986 [DE] Fed. Rep. of Germany ....... 3603316

[51] Int. Cl.$^4$ ............................................ G05B 19/10
[52] U.S. Cl. .................................... 318/567; 318/565; 318/569; 364/474.34
[58] Field of Search ........................ 318/567, 569, 565; 364/475

[56] References Cited
U.S. PATENT DOCUMENTS
4,620,281 10/1986 Thompson et al. ................. 364/475

FOREIGN PATENT DOCUMENTS
326975 1/1976 Austria .
2941156 4/1981 Fed. Rep. of Germany .

OTHER PUBLICATIONS
Traub AG Instruction Manual, "Integrierte Messteuerung", (44 pp.).
Brochure "CNC-Drehmaschinenreihe Traub-TNA 480", (7 pp.).
Brochure "CNC-Drehmaschinenreihe Traub-TNS 30", (20 pp.).

Primary Examiner—William M. Shoop, Jr.
Assistant Examiner—Saul M. Bergmann
Attorney, Agent, or Firm—Shenier & O'Connor

[57] ABSTRACT

Device for setting the working point of a tool with respect to a reference point in an NC machine tool with a tool slide system and a path measuring system for the tool slide motion which is connected to a machine control system, and with a control sensor for transmitting a correction signal to the machine control system. The control sensor can be brought to the reference point, up to and over which the tool point can be moved by program control, starting from a starting point of the tool slide. The starting point of the tool slide and the reference point are spaced at a specified distance from one another and distances of the tool point from the starting point of the tool slide can be balanced by the machine control system against reference distances which can be evaluated by the machine control system on the basis of the correction signal and also on the basis of path measurement signals of the path measuring system. For rapid measurement of a tool at almost any location in the working area of the machine tool, the control sensor is arranged on a second tool slide system likewise provided with a path measuring system and its sensing point is brought up to the reference point, starting from a starting point of the control sensor slide, with the two starting points being spaced at a specified distance from one another.

9 Claims, 7 Drawing Sheets

DEVICE FOR SETTING THE WORKING POINT OF A TOOL IN AN NC MACHINE TOOL

The invention relates to a device for setting the working point of a tool with respect to a reference plane or a reference point in an NC machine tool with a tool slide system to which the tool is attachable and with which the tool point is movable in a plane of motion, and with a path measuring system for the tool slide motion which is connected to a machine control system, and with a control sensor for transmitting a correction signal to the machine control system and having a sensing point which can be brought in the plane of motion of the tool point into the reference plane or to the reference point, up to and over which the tool point can be moved by program control, starting from a starting point of the tool slide, with the starting point of the tool slide and the reference plane or the reference point being spaced at a specified distance from one another and with distances of the tool point from the starting point of the tool slide specified by program commands for machining a workpiece being balanced by the machine control system against distances which can be evaluated by the machine control system on the basis of the correction signal and also on the basis of path measurement signals of the path measuring system.

Known devices of this kind, for example, that according to German Patent 1,945,017 of the applicant company and its marketed device for measuring tools in the working area of NC lathes comprise a quasi-stationary control sensor which prior to the measuring procedure must be swung or moved into a stationary location in the working area of the machine tool which is easily accessible by the tool. Since this location is usually in the normal working area of the tools, the control sensor must be removed again after the measuring procedure. The swinging in and out or moving in and out involves considerable structural and manufacturing expenditure because the motions of the control sensor must be carried out quickly and precisely. In spite of precise design, the leverage ratios, for example, in a control sensor which can be swung in, in relation to its sensing point, result in a certain tolerance range of the measuring position of the sensing point of the control sensor which impairs precision of the measurement of the working point of the tool edge. The above-mentioned leverage ratios also increase the dispersion of the position of the sensing point of the control sensor owing to heat influences. A further disadvantage of the known measuring device is that the chuck for the workpieces which are to be machined and the workpieces themselves influence the availability of space for the measuring device. With unfavorable workpiece dimensions, it may be necessary to unclamp the workpiece to enable measurement of a tool, which is not only time-consuming and tedious, but also involves problems with respect to precise adjustment of the workpiece which has to be reclamped.

The known measuring device also requires a time-consuming measuring cycle: The control sensor must first be swung or moved into the working area of the machine tool, whereupon the tool is moved itto a position in the proximity of the control sensor. The tool point is then brought up to the control sensor at a low speed of the tool slide system. After generation of the correction signal, the tool must first be moved away from the control sensor before the latter can be swung out of the working area. If the control sensor were approached by the tool at a higher speed, the control sensor could break if the slide carrying the tool caused too great a deflection of the control sensor as a result of a larger slowing down path.

Finally, in a lathe comprising one tool carrier at the front and one tool carrier at the rear of the axis of rotation of the workpiece for machining shaft-type workpieces, in order to measure the tools of the rear tool carrier with the known measuring device, the workpiece must be unclamped prior to the measuring procedure or two measuring devices must be used.

The object underlying the invention was to provide a device for setting the working point of a tool in a numerically controlled machine tool which does not have the above-mentioned disadvantage of limiting the space within the working area of the machine tool, and, starting from a device of the kind mentioned at the beginning, this object is achieved in accordance with the invention by the control sensor being arranged on a second slide system likewise provided with a path measuring system and being movable with its sensing point by program control, starting from a starting point of the control sensor slide, into the reference plane or to the reference point, and by the two starting points being spaced at a specified distance from one another.

The inventive setting device not only achieves the set object but also offers the advantage that the hitherto necessary swinging or moving of the control sensor into the working area is eliminated. Furthermore, the above-mentioned limitations with respect to the dimensions of the workpiece and the clamping means for holding it are dispensed with. Also, with use of the inventive setting device, the location at which the tool is measured is freely selectable and may be at any point in the working area which can be approached by program control. Hence this location can be adapted to the dimensions of the clamped workpiece. The saving in time which is gained with the inventive setting device is also highly advantageous: Firstly, the time required to swing in or move in the control sensor of the known setting device is eliminated. Furthermore, the inventive setting device can be used in such a way that the motions required for the measuring procedure can be carried out at rapid traverse speed - travel up to a certain point a short distance in front of the control sensor with the subsequent program command to travel over the control sensor at a low speed, as required in the prior art, can then be eliminated. Also, with the inventive device, after generation of the correction signal and without previous switching-off of the drive for the second slide system, the control sensor can be moved immediately into another position in which the slide carrying the control sensor is next required, for example, into a tool changing position.

It is particularly advantageous for the tool to be measured in that position of its tool carrier, for example, in that indexed position of a turret carrying the tool in which it is located for machining a workpiece—this is not absolutely necessary as the sensing point of the control sensor could also be above or below that plane in which the tool point moves during the machining operation. In a preferred embodiment of the inventive setting device, the sensing point of the control sensor is, therefore, movable with the second slide system in the plane of motion of the tool point.

Since transmission of the correction signal from the control sensor to the machine control system requires a certain time, the machine control system receives the correction signal with a certain time delay. This is, however, of no significance at higher speeds of the two slide systems since a difference is always formed from the sum of two path measurements corresponding to each other and the distance of the two starting points from each other, if, as in a particularly preferred embodiment, the inventive setting device is so designed that in the event that the correction signal is generated with both slide systems being driven simultaneously, on the basis of the correction signal at the moment of contact between control sensor and tool point, the distances of the sensing point of the control sensor and of the tool point from the starting points resulting frm the path measurement signals can be simultaneously registered and balanced by the machine control system against distances of the tool point from the starting point of the tool slide specified by program commands, in order to form a correction value. In this connection, it should be noted that the measurement motions of the control sensor and of the tool to be measured may readily be in the same direction. Hence even an increased lag error of the two slide systems owing to higher slide speeds does not result in any great deflection of the control sensor since the two slides carrying the control sensor and the tool then also slow down in the same direction and, therefore, the deflection of the control sensor corresponds to only the speed difference of the two slides.

Finally, it is worthy of mention that the advantage of the difference measurement lies, above all, in the fact that the positions of the control sensor and of the tool to be measured can each be determined by direct reporting of the path measuring systems to a so-called high-speed measuring input of the machine control system—such high-speed measuring inputs are known in modern numerical control systems for machine tools—hence a misalignment in position which may occur in spite of the reference value/actual value compensation is not suppressed but taken into account in the balancing carried out by the machine control system, and, in particular, independently of whether both slide systems are simultaneously moved or one of these slide systems is stopped during measurement of the tool.

Since so-called 4-axes machines with two workpiece carriers, each arranged on a compound slide system of their own, are gaining in popularity, it is recommended in the case of such 4-axes lathes to arrange the control sensor on one of the two tool carrier slide systems and, in particular, to provide on each of the two tool carrier slide systems a control sensor for measurement of the tools of the other tool carrier. Accordingly, such an embodiment is characterized in that the second slide system carries a tool carrier which can be indexed to several positions with respect to the second slide system and comprises a number of stations corresponding to the number of positions, and in that the control sensor can be arranged at one of these stations and its sensing point can be brought into the plane of motion of the tool point to be measured by indexing of the tool carrier.

In the machining of shaft-type workpieces whose two ends are held by the machine tool, for example, by a chuck and a tailstock sleeve, to enable one slide system to be provided on one side and the other slide system on the other side of the workpiece, as is the case with conventional 4-axes lathes, and to enable a tool to be measured without removing the workpiece from the working area, it is recommended for a machine tool with a work spindle drivable about an axis of rotation for holding a workpiece which is to be machined, to provide a transmission element mounted floatingly on a stationary part, with the transmission element being approachable at two opposite sides by the sensing point of the control sensor and by the tool point, respectively, and with the two sides of the transmission element being spaced at a specified distance from one another. Such a transmission element can then be mounted, for example, on the tailstock sleeve of the lathe.

The inventive setting device is also particularly well suited for calibration of the control sensor since it is only necessary to provide a reference surface against which the control sensor can be brought with its sensing point and which is spaced at a specified distance from an immovably arranged workpiece carrier. In a lathe, the reference surface can, therefore, be advantageously arranged on the so-called headstock in which the work spindle carrying the workpieces is rotatably mounted.

Finally, in a machine tool with a work spindle drivable about an axis of rotation for holding a workpiece which is to be machined, to enable measurement of both a tool edge in the radial direction and a tool edge in the axial direction, it is recommended that the control sensor be designed so as to comprise a first sensing surface approachable in the radial direction and a second sensing surface approachable in the axial direction, with each of these forming a sensing point. It is particularly advantageous for at least one of the sensing surfaces to be of spherical design.

Further features, advantages and details of the invention are apparent from the following description and from the appended drawings of several particularly advantageous embodiments of the inventive setting device. In the drawings.

Figure 1:
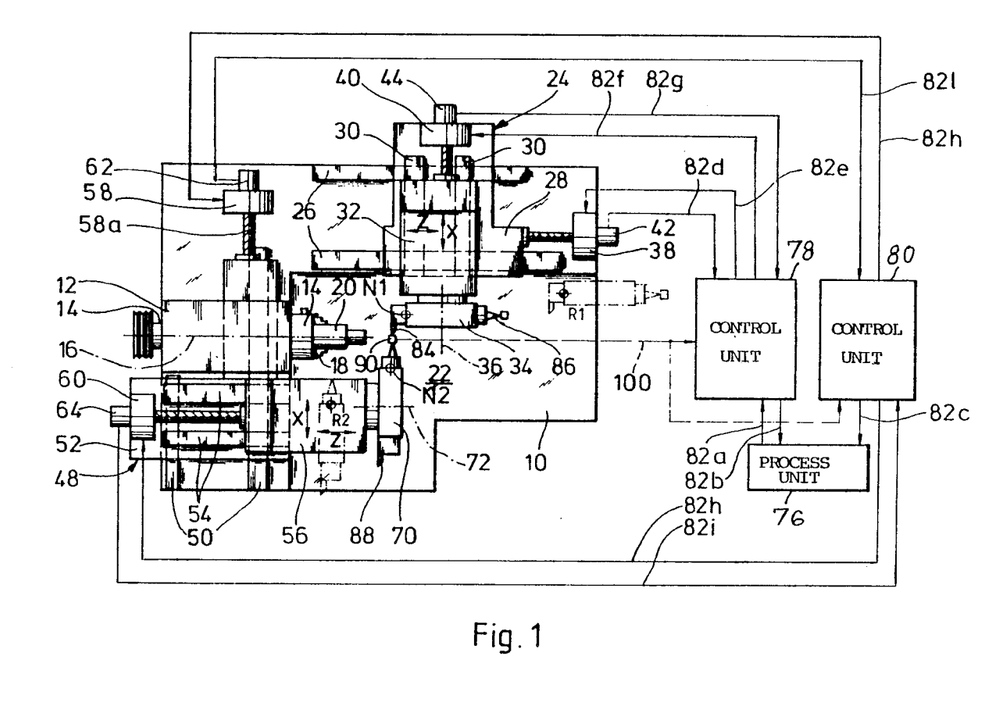
FIG. 1 is a plan view of a 4-axes lathe with two turrets, each of which was equipped with a control sensor in one of its stations, illustrating measurement of a tool of that turret whose indexing axis extends perpendicularly to the axis of the main work spindle.

In the 4-axes lathe illustrated in FIG. 1, a so-called headstock 12 in which a main work spindle 14 is rotatably mounted, in particular, about an axis of rotation 16 indicated by a dot-and-dash line, is arranged on a machine frame 10. The main work spindle 14 carries a chuck 18 in which a workpiece 20 is clamped. For reasons of clarity, the drive for the main work spindle is not illustrated.

A first compound slide system 24 is mounted on the machine frame 10 at the rear side of a working area 22 of the lathe which is accessible from the front, i.e., from below in accordance with FIG. 1. Guideways 26 attached to the machine frame 10 serve to guide a bottom slide 28 parallel to the axis of rotation 16 (Z axis) and guideways 30 attached to the bottom slide to guide a top slide 32 horizontally and perpendicularly to the axis of rotation 16 (X axis). In the top slide 32, a turret 34 is mounted for rotation about a horizontal indexing axis 36. A feed drive 38 serves to displace the bottom slide 28 in the direction of the Z axis, a feed drive 40 to displace the top slide 32 in the direction of the X axis. Each feed drive is connected to a path measuring system 42 and 44, respectively, by means of which the distance covered by the respective slide along the Z axis and along the X axis, respectively, can be registered.

Mounted in front of the headstock 12 is a second compound slide system 48 comprised of guideways 50 for a bottom slide 52 which are attached to the machine frame 10 and extend in the direction of the X axis, uideways 54 for a top slide 56 which are attached to the bottom slide and extend in the direction of the Z axis, feed drives 58 and 60 and path measuring systems 62 and 64 for the bottom slide 52 and the top slide 56, respectively, of this compound slide system. In this connection, it should be noted that a threaded spindle 58a which belongs to feed drive 58 extends below the headstock 12 and below the main work spindle 14 through to the bottom slide 52 where it cooperates with a recirculatory-ball nut, not shown, which is connected to the bottom slide. The feed drives 38 and 58 are mounted on the machine frame 10, the feed drives 40 and 60 on the bottom slide 28 and on the bottom slide 52, respectively. In the top slide 56, a turret 70 is mounted for rotation about an indexing axis 72 extending in the direction of the Z axis. For reasons of clarity, the drives for indexing the two turrets 34 and 70 about their indexing axes 36 and 72 were omitted.

So far, the lathe described hereinabove corresponds to the prior art and, therefore, further details need not be given.

A machine control system for this numerically controlled lathe comprises, among other things, a processing unit 76 and two control units 78 and 80 which are connected in the illustrated manner to each other and to the feed drives 38, 40, 58, 60 and to the path measuring systems 42, 44, 62, 64 by data transmission and control lines 82a to 82k.

To simplify the illustration, the two turrets 34 nd 70 were illustrated as if only two of their stations, in each case were equipped. Accordingly, a tool 84 secured in a tool holder and a control sensor 86 are drawn at turret 34, a tool 88 secured in a tool holder and a control sensor 90 at turret 70.

Measurement of tool 84 by means of control sensor 90 will now be explained in further detail with reference to FIG. 3.

Figure 3:
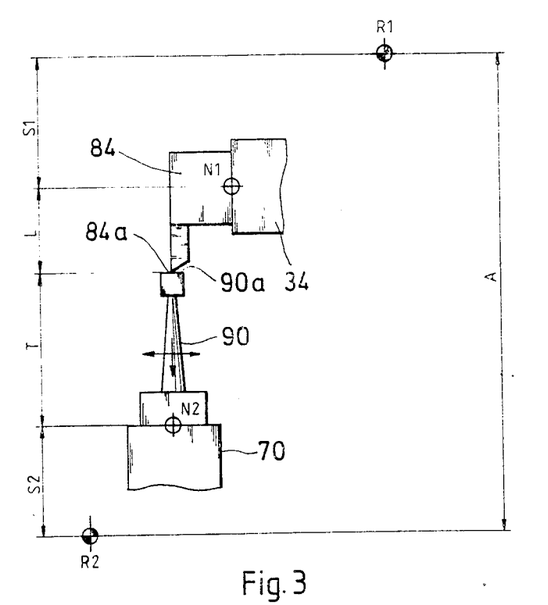
FIG. 3 is a section taken from FIG. 1 to illustrate the principle of the measuring procedure as performed by means of the inventive setting device.

Two starting points R1 and R2 are shown in FIGS. 1 and 3. FIG. 1 also shows in dot-and-dash lines the position of tool 84 and of control sensor 90 with turrets 34 and 70 located at these starting points. For the drawings, it was assumed that when the two turrets assume their initial positions, these starting points lie on the tool hole axes of the stations of the two turrets located in the working position, and in particular, where the respective tool hole axis penetrates the outer surface of the respective turret. These points which are the tool reference point and the control sensor reference point, respectively, were designated by N1 and N2, respectively.

The control program for the numerically controlled lathe is of such configuration that when the lathe is switched on, the two turrets 34 and 70 are moved so that the tool reference point N1 is brought into the stationary starting point R1 with respect to machine frame 10 and the control sensor reference point N2 into the likewise stationary starting point R2 with respect to the machine frame, if necessary, after a corresponding indexing or rotary motion of one or the other or both turrets about their indexing axes. The path measuring systems 42, 44, 62, 64 and the memory devices in the control units 78 and 80 associated with the path measuring systems are set at zero. The starting points R1 and R2, therefore, constitute the starting points for the motions of the two compound slide systems 24 and 48 which are controlled by a program. Subsequently, the control sensor 90 is brought by means of an automatically performed measuring program into a specified measuring position which, in principle, may lie at any point in the working area 22 which can be approached by the point 84a of tool 84. By program control, the tool point 84a is then also moved into this measuring position from starting point R1. The program is of such configuration that the tool point is moved so long in the direction of the X axis, if necessary, also beyond the programmed measuring position, until the control sensor 90 is moved by the tool point in the direction of the X axis into its switching position—such control sensors are known, and, in particular, also control sensors which are deflectable in the direction of three axes arranged perpendicularly on one another (Z, X and Y axes) and generate an electric signal on transcending a switching position. These can, for example, be purchased from the firm of Renishaw. While the tool point 84a is moved in the direction of the X axis into the measuring position, the path measuring system 44 continually registers the distance covered in the direction of the X axis and reports it to control unit 78 through data transmission line 82g. When the control sensor 90 has been moved into its switching position and generates a correction signal, this correction signal is transmitted to control units 78 and 80, as illustrated by a dashed line in FIG. 1, and, in particular, by wireless transmission, recently made available, preferably on the basis of an infrared signal. The transmission line is designated by 100 in FIG. 1. When the control unit 78 receives the correction signal, the path measurement signal provided by the path measuring system 44 is stored in a memory of control unit 78. This path measurement signal represents the distance actually covered by the top slide 32 on the path from the starting point R1 in the direction of the X axis until generation of the correction signal by the control sensor 90. This actual value is compared in control unit 78 with the reference value specified by the control program, whereupon the discrepancy between the distance of the tool point 84a from the tool reference point N1 in the direction of the X axis and a reference value taken into account in the control program is evaluated in the processing unit 76 and stored for further operation of the lathe as correction value for the path of tool 84 in the direction of the X axis and is allocated to the program commands for tool 84.

A first embodiment of the inventive measuring procedure for measurement of the tool 84 in the direction of the X axis has been described hereinabove. The following, preferred modification of the measuring procedure is, however, even more time-saving:

During travel of the control sensor 90 from the starting point R2 in the direction towards the illustrated measuring position, the path measurement signal of the path measuring system 62 is also continually transmitted through data transmission line 821 to the control unit 80, i.e., the actual value of the distance covered by the bottom slide 52, starting from starting point R2, in the direction of the X axis.

If the control sensor 90 is then actuated by the tool point 84a, the correction signal generated by it is also transmitted to the control unit 80 through the transmission line 100, and the actual values determined by the two path measuring systems 44 and 62 are upon receipt of the correction signal simultaneously stored in the control units 78 and 80 and calculated in the processing unit 76 to evaluate the actual length L (see FIG. 3) of tool 84 and transmit it to control unit 78.

In accordance with FIG. 3, the actual length L of tool 84 is obtained from the following equation:

$$L = A - (S1 + S2 + T),$$

where A is the specified distance of starting points R1 and R2 from each other in the direction of the X axis, S1 the distance covered from the tool reference point N1, starting from the starting point R1, in the direction of the X axis, S2 the distance covered from the control sensor reference point N2, starting from the starting point R2, in the direction of the X axis and T the known distance of the sensing surface 90a of the control sensor 90 from the control sensor reference point N2 in the direction of the X axis.

In this second embodiment of the inventive measuring procedure it is, therefore, unnecessary to keep the control sensor 90 in a measuring position specified by the control program until it is actuated by the tool point 84a being brought up to the sensing surface 90a.

While measurement of a tool of the rear turret 34 in the direction of the X axis has been explained hereinabove with reference to FIGS. 1 and 3, FIG. 2 serves to explain measurement of a tool, for example, tool 88 of the front turret 70 in the direction of the X axis by means of a control sensor, for example, control sensor 86 of the rear turret 34. From the indexed positions of the turrets 34 and 70 shown in FIG. 1 it is merely necessary to index or turn the two turrets through 180 degrees, in each case. The measuring procedure is the same, in principle, as described hereinabove with reference to FIGS. 1 and 3, with the sole difference that a correction signal is now transmitted from control sensor 86 through transmission line 100' to control unit 80 or to both control units 78, 80 and the correction value calculated by control unit 76 is entered into control unit 80.

Figure 2:
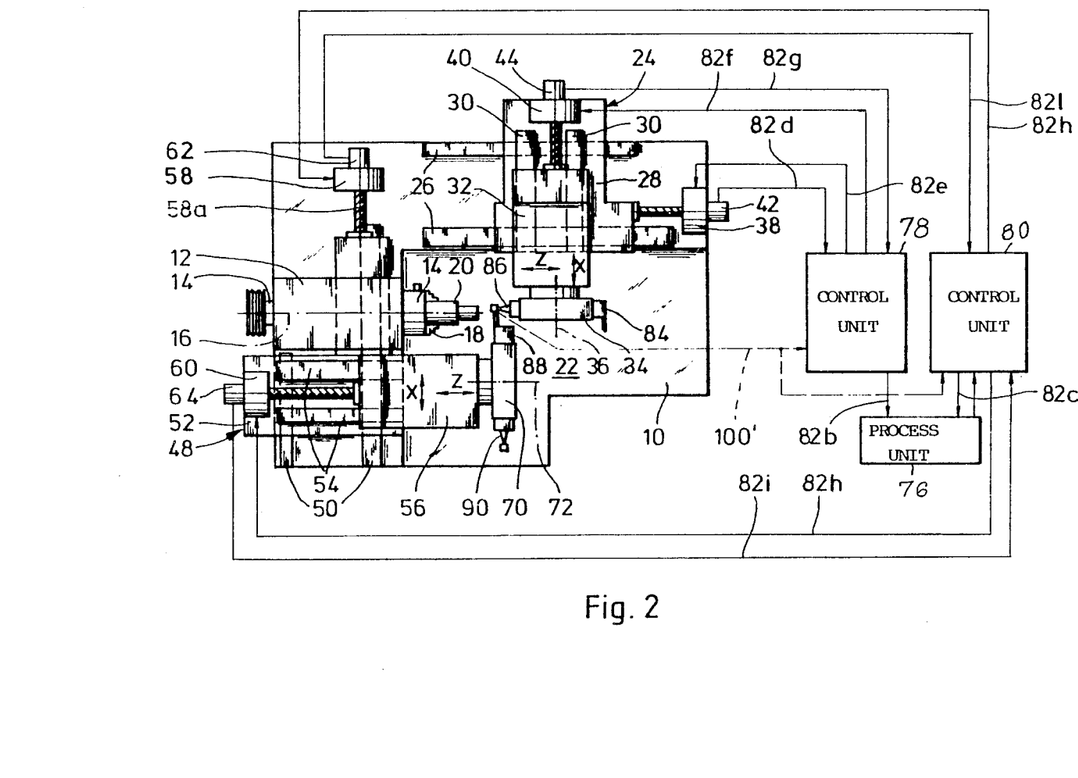
FIG. 2 is a further plan view of the same lathe, but during measurement of a tool of that turret whose indexing axis extends parallel to the axis of the main work spindle.

Since control sensors 86 and 90 are so-called 3-D sensors, i.e., control sensors which, as mentioned, can be actuated in the three directions of the three machine axes (Z axis, X axis and the Y axis extending perpendicularly to the drawing plane of FIGS. 1 to 3) which are perpendicular to each other, it is readily apparent that with the inventive setting devices illustrated in FIGS. 1 to 3 tools can, for example, also be measured in the direction of the Z axis. One need only imagine on considering FIG. 2 that turret 70 carries, instead of tool 88, tool 84 whose point can be brought up to the control sensor 86 of turret 34 in the direction of the Z axis. With such a measuring program, the actual distances covered in the direction of the Z axis, starting from the starting points R1 and R2 would then be registered by path measuring systems 42 and 64.

Figure 4:
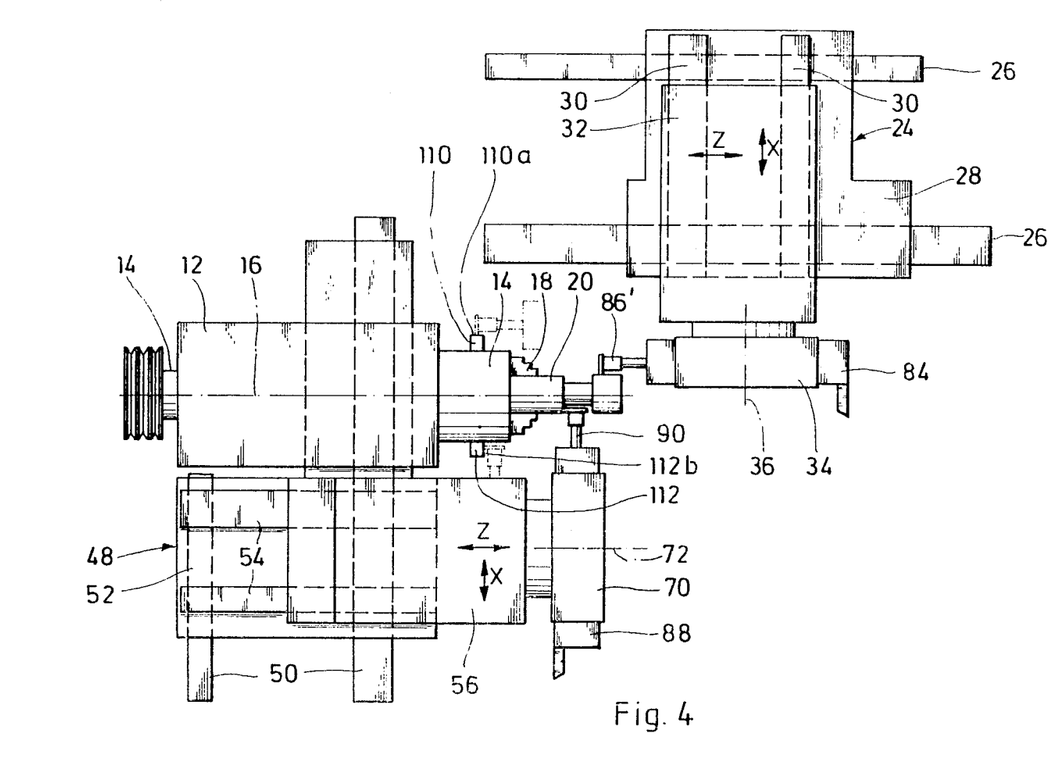
FIG. 4 is a further plan view of a 4-axes lathe, namely that of FIGS. 1 and 2, but with reference surfaces provided on the so-called headstock for calibrating two control sensors held by the two turrets.

FIG. 4 shows modified control sensors 86' and 90' in the turrets 34 and 70 which will first be explained in further detail with reference to FIGS. 5 and 5a. It is to be assumed that the two control sensors are of identical design and it is, therefore, adequate to describe control sensor 90' at somewhat greater length. As is apparent from FIGS. 5 and 5a, it comprises a sensing surface 90a' on the front side, two sensing surfaces 90b' and 90c' extending perpendicularly thereto and also an annular and spherical sensing surface 90d' on the front side. As indicated by the tool points 84a illustrated by continuous lines, dashed lines and dot-and-dash lines, the tool points can be measured by the sensing surfaces 90a', 90b' and 90c' in two directions perpendicular to each other and the spherical sensing surface 90d' can be used to measure radii and diameters.

Figure 5:
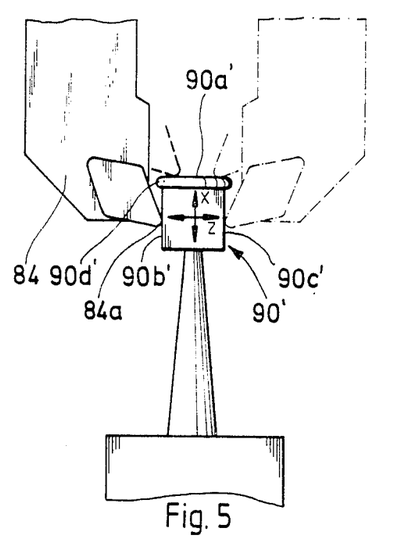
FIG. 5 is a larger illustration of another embodiment of the control sensor together with tool edges shown in several positions, with the control sensor shown in a side view.
Figure 5A:
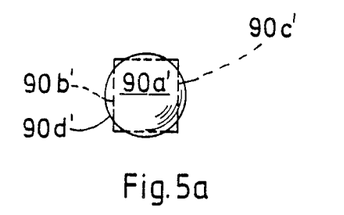
FIG. 5a is a front end view of the control sensor according to FIG. 5.
Figure 6:
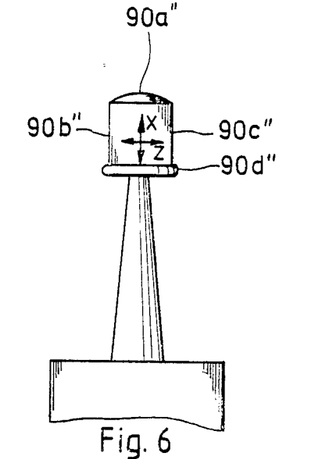
FIG. 6 is a side view of an alternative embodiment of the control sensor shown in FIG. 5.
Figure 6A:
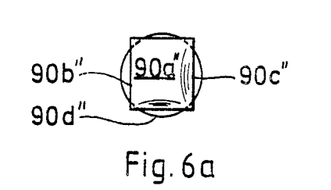
FIG. 6a is a front end view of the control sensor according to FIG. 6.

FIGS. 6 and 6a show a particularly advantageous variant of the control sensor illustrated in FIGS. 5 and 5a. This variant comprises in addition to planar sensing surfaces 90b'' and 90c'' and an annular and spherical surface 90d''', a spherical sensing surface 90a'' on the front side to enable measurement of radii and diameter in the direction of the X axis.

FIG. 4 serves to explain calibration of the control sensors prior to measurement of the tools. For this purpose, calibration elements of, for example, block or cube shape with calibration surfaces are arranged at stationary points relative to the main work spindle 14. In accordance with the invention, the calibration surfaces 110a and 112b up to which the control sensors 86' and 90' are brought—indicated by dot-and-dash lines—are located at a constant and previously known distance from the axis of rotation 16 (calibration surface 110a) and from an axial workpiece stop of chuck 18 (calibration surface 112b), respectively. The workpiece stop is not illustrated but is usually provided. The calibration elements 110 and 112 may be attached to the headstock 12, but they can also be arranged on the main work spindle 14 which in every NC lathe can be stopped in a position at a certain rotary angle.

When the control sensors are calibrated, the actual value of the distances covered by the slides which is determined by the path measuring systems and registered when the correction signal is generated, is compared with the specified distance of the calibration surfaces from the starting points R1 and R2 and the thereby determined correction values relating to the control sensors are stored in the control units 78 and 80 to enable corresponding correction of the tool length ascertained during subsequent measurement of the tools.

Figure 7:
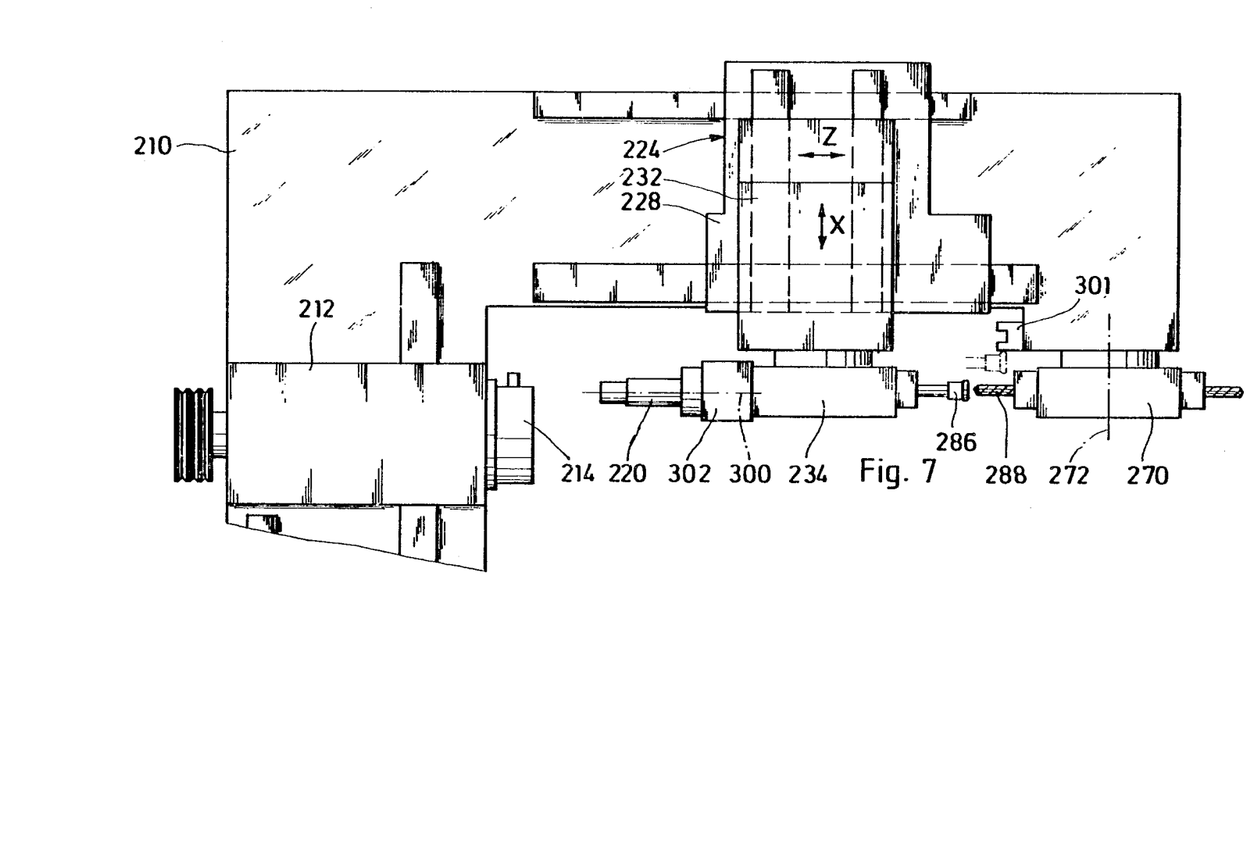
FIG. 7 is a plan view of a lathe with a turret which is arranged on a compound slide system and which comprises in one of its stations a control sensor for measurement of the tools of a second stationary tool carrier.

FIG. 7 shows some parts of a third embodiment of a lathe with an inventive setting device, again in a plan view. A machine frame 210 carries in the conventional manner a compound slide system 224 with a bottom slide 228 movable in the direction of the Z axis and a top slide 232 movable in the direction of the X axis with a turret 234 mounted thereon for rotation about an indexing axis extending parallel to the X axis. A main work spindle 214 is rotatably mounted in a headstock 212. Also rotatably mounted on machine frame 210 is a turret 270 which has a stationary indexing axis 272 and is equipped, for example, with drills as tools 288. On the other hand, one station of turret 234 is equipped with a control sensor 286 and another station of this turret with a chuck 302 drivable about an axis of rotation 300 for holding a workpiece 220 which has previously been held by the main spindle 214 and machined by tools of turret 234 which are not illustrated.

By means of control sensor 286, first the tools 288 can be successively measured with respect to their length (i.e., in the direction of the Z axis) and also with respect to their diameter (in the direction of the X axis), if necessary, after calibration of control sensor 286 by means of a stationary calibration element 301 attached to machine frame 210, whereupon turret 234 is turned through, for example, 180 degrees to enable workpiece 220 driven in the known manner to be machined by the tools of turret 270.

From FIG. 7 it is apparent that in this embodiment it is not a question of the calibration elements being positioned in a specified manner with respect to the main work spindle, but, in accordance with the invention, with respect to a stationarily arranged tool carrier, namely turret 270, in this case.

Figures 8, 9, 10:
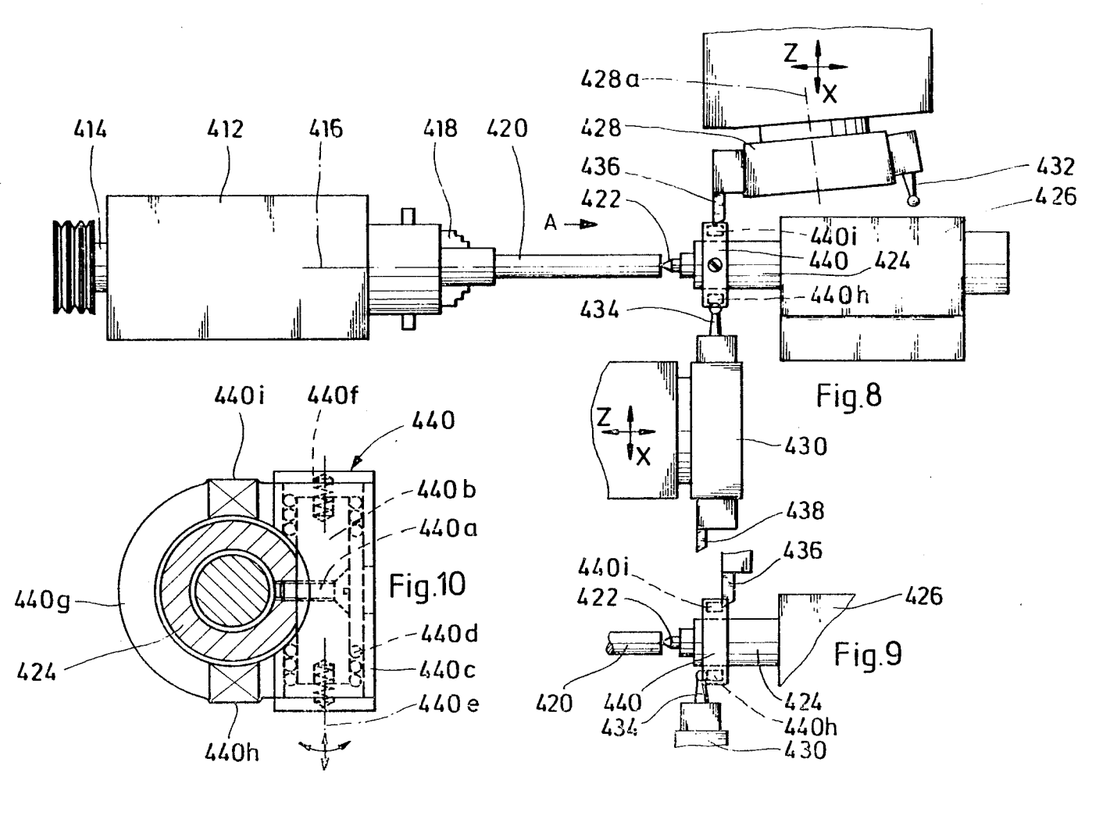
FIG. 8 is part of a plan view of a 4-axes lathe for machining shaft-type workpieces which comprises a transmission element which is floatingly mounted on a tailstock sleeve and which can be approached on one of its sides by the tool which is to be measured and on its other side by a control sensor, and, in particular, in the illustration in FIG. 8, for the purpose of measuring a tool in the radial direction (relative to the axis of rotation of the workpiece)
FIG. 9 is a section taken from FIG. 8 wherein measurement of a tool in the axial direction is now illustrated.
FIG. 10 is a partly sectional front end view of the tailstock sleeve with transmission element, viewed in the direction of arrow A in FIG. 8.

Finally, FIGS. 8 to 10 shown an embodiment of the inventive setting device which is particularly well suited for lathes for machining shaft-type workpieces which are, therefore, held at their two ends.

FIG. 8 again shows a headstock 412 in which a main work spindle 414 is rotatably mounted. It carries a workpiece chuck 418 for holding one end of a shaft-type workpiece 420 which is drivable about its axis coinciding with the axis of rotation 416 of the main work spindle 414. The other end of workpiece 420 comprises at its front face a central recess, a so-called center hole into which the center 422 of a so-called tailstock sleeve 424 engages. The latter is held in a so-called tailstock 426 in such a way that the axis of the center 422 coincides with the axis of rotation 416. As is usually the case in lathes, the tailstock 426 is displaceably guided and immobilizable in the direction of the axis of rotation on a machine frame which is not illustrated.

Two compound slide systems replaced by double arrows extending in the direction of the X axis and the Z axis carry in the conventional manner two turrets 428 and 430. From turret 428 it is apparent that the indexing axis 428a of the turrets need not always extend parallel or perpendicularly to the axis of rotation 416, but may also extend at an incline to the axis of rotation if the turret body is correspondingly designed. In the illustrated embodiment, each turret is equipped with a control sensor 432 and 434, respectively, and a tool 436 and 438, respectively and, in accordance with the invention, a transmission element 440 is floatingly mounted on the tailstock sleeve 424 but when it is free of external forces is held by suitable energy storing devices in a rest or zero position.

If a tool located on one side of the axis of rotation 416 is to be measured by a control sensor located on the other side of the axis of rotation, as is the case in FIG. 8 with tool 436 and control sensor 434, the direct contact of the tool with the control sensor can be replaced by tool and control sensor being brought up to opposite sides of the transmission element 440. As illustrated in FIG. 8, for example, tool 436 can be moved in the direction of the X axis up to the rear end face of the transmission element 440, while the sensing surface of the control sensor 434 rests against the front end face of the transmission element 440. Due to the transmission element being floatingly mounted, i.e., its movability in the direction of the X axis, the control sensor 434 can then be actuated in the direction of the X axis without the tool 435 touching the control sensor itself.

If the transmission element 440 is floatingly mounted not only in the sense of linear displacement but also in the sense of pivoting, tilting and/or rotary motion about its longitudinal axis which, in the illustrated embodiment, extends parallel to the X axis, the tool 436 can then be measured not only in the direction of the X axis, as illustrated in FIG. 8, but also in the direction of the Z axis, as is apparent from FIG. 9.

FIG. 10 shows a particularly advantageous embodiment of the transmission element 440. In this embodiment, a ballguide member 440b of the transmission element 440 is attached by a screw 440a to the tailstock sleeve 424. The ball-guide member sits in a sleeve 440c which is mounted by means of balls 440d on the ball-guide member 440b, more particularly, for displacement along an axis 440e of the ball-guide member 440b and for rotation about this axis. This sleeve is closed at the end face and is held in a zero or rest position with respect to both translation and rotation by return springs 440f subjected to compression or tension and torsion, insofar as the transmission element 440 is free of external forces. Attached to the sleeve 440c is a bracket 440g which bridges the tailstock sleeve 424 and carries sensing surface elements 440h and 440i at points on the transmission element located opposite each other with respect to the axis of the tailstock sleeve.

To facilitate understanding of the claims, reference is made again to FIG. 3 from which the following is apparent: The tool point 84a is to be displaceable in the drawing plane of FIG. 3 by means of the first compound slide system 24. The reference plane as referred to in the claims is that plane perpendicular to the drawing plane of FIG. 3 which extends through the tips of double arrows L and T and also through the tool point 84a when the control sensor 90 is actuated by the tool point 84a. Reference point is that point at which the tool point 84a touches the sensing surface 90a when the control sensor 90 is actuated by the tool. Since length T of control sensor 90 is known, the reference plane or the reference point is located at a specified distance from the starting point R2 of the control sensor slide and due to the specified distance of the two starting points A1 and A2 from one another, also at a specified distance from the starting point R1 of the tool slide. From the path measurement signals S1 and S2 registered at the point in time at which the correction signal is generated, the actual length L of the tool can be calculated due to the previously known length T of the control sensor 90 since distance A between the two starting points R1 and R2 is also known and constant.

We claim:

1. A method for setting the working point of a tool with respect to a reference point in an NC machine tool including:
   (a) a work spindle rotatable about a spindle axis for holding a workpiece which is to be machined;
   (b) a first slide system having a lower and an upper slide mounting a first tool carrier for moving the latter parallel and lateral to said spindle axis, said first tool carrier being indexable to a number of positions with respect to the upper slide of said first slide system and having a number of stations corresponding to the number of positions and at least one tool having a working point in at least one of its stations for machining said workpiece when, by indexing the first tool carrier, said tool is brought into a working position;
   (c) a second slide system having a lower and an upper slide mounting a second tool carrier for moving the latter parallel and lateral to said spindle axis, said second tool carrier being indexable to a number of positions with respect to the upper slide of said second slide system and having a number of stations corresponding to the number of positions and at least one tool having a working point in at least one of its stations for machining said workpiece when, by indexing the second tool carrier, said tool is brought into a working position;
   (d) a first path measuring system for producing first position signals in response to movements of the slides of the first slide system relative to a first starting point of the first slide system;
   (e) a second path measuring system for producing second position signals in response to movements of the slides of the second slide system relative to a second starting point of the second slide system;
   (f) a first control sensor mounted in a station of the first tool carrier and a second control sensor mounted in a station of the second tool carrier for bringing said sensors into a sensing position by indexing the respective tool carrier, each of said control sensors having a sensing point and being designed to produce a correction signal when being actuated;
   (g) first and second drive means for driving said first and said second slide system to move the working point of a tool being in its working position and the sensing point of a control sensor being in its sensing position into said reference point;
   (h) a machine control and calculating system; and
   (i) communication means for communicating said position signals and said correction signal to said machine control and calculating system;

said method comprising the following steps:
   (1) bringing a selected tool of one of said tool carriers into its working position and the control sensor of the other tool carrier into its sensing position;
   (2) moving the working point of said selected tool and the sensing point of said control sensor of said other tool carrier into the reference point, thereby actuating said control sensor by the working point of the selected tool;
   (3) picking up the correction signal produced by the control sensor actuated by said selected tool and the position signals produced by the first and second path measuring systems by the machine control and calculating system; and
   (4) calculating the position of the working point of said selected tool with respect to the starting point of the slide system mounting said selected tool.

2. A method as claimed in claim 1, wherein, prior to moving the sensing point of the control sensor of said other tool carrier into said reference point, the sensing point of said control sensor is moved to a reference surface being spaced at a specified distance from an immovably arranged workpiece or tool carrier, whereupon said control sensor is actuated by the reference surface and its correction signal and the position signals produced by the path measuring system related to said control sensor are picked up by the machine control and calculating system for calibrating said control sensor.

3. An NC machine tool for carrying through the method according to claim 1, said machine tool comprising:
   (a) a work spindle rotatable about a spindle axis for holding a workpiece which is to be machined;
   (b) a first slide system having a lower and an upper slide mounting a first tool carrier for moving the latter parallel and lateral to said spindle axis, said first tool carrier being indexable to a number of positions with respect to the upper slide of said first slide system and having a number of stations corresponding to the number of positions and at least one tool having a working point in at least one of its stations for machining said workpiece when, by indexing the first tool carrier, said tool is brought into a working position;
   (c) a second slide system having a lower and an upper slide mounting a second tool carrier for moving the latter parallel and lateral to said spindle axis, said second tool carrier being indexable to a number of positions with respect to the upper slide of said second slide system and having a number of stations corresponding to the number of positions and at least one tool having a working point in at least one of its stations for machining said workpiece when, by indexing the second tool carrier, said tool is brought into a working position;
   (d) a first path measuring system for producing first position signals in response to movements of the slides of the first slide system relative to a first starting point of the first slide system;
   (e) a second path measuring system for producing second position signals in response to movements of the slides of the second slide system relative to a second starting point of the second slide system;
   (f) a first control sensor mounted in a station of the first tool carrier and a second control sensor mounted in a station of the second tool carrier for bringing said sensors into a sensing position by indexing the respective tool carrier, each of said control sensors having a sensing point and being designed to produce a correction signal when being actuated;
   (g) first and second drive means for driving said first and said second slide system to move the working point of a tool being in its working position and the sensing point of a control sensor being in its sensing position into said reference point;
   (h) a machine control and calculating system;
   (i) communication means for communicating said position signals and said correction signal to said machine control and calculating system; and (j) said first and said second starting point being spaced a specified distance from each other.

4. An NC machine tool as claimed in claim 3, wherein said first and said second slide systems are provided with guide means enabling movement of the working point of a tool being in working position and of the sensing point of a control sensor being in sensing position in the same plane comprising said reference point.

5. An NC machine tool claimed in claim 3 or 4, wherein at least one of said control sensors comprises a first sensing surface oriented approximately normal to the axial and a second sensing surface oriented approximately normal to a radial direction of the spindle axis, each of said sensing surfaces forming a sensing point.

6. An NC machine tool as claimed in claim 5, wherein at least one of said sensing surfaces is of spherical design.

7. An NC machine tool as claimed in claim 3, characterized by a transmission element, means floatingly mounting said transmission element on a stationary part of said machine tool in a position to be approached by the sensing point of a control sensor being in sensing position and by the working point of a tool being in working position, respectively, at two opposite sides of the transmission element, and with said two opposite sides of the transmission element being spaced at a specified distance from one another.

8. An NC machine tool as claimed in claim 3, wherein for calibration of said control sensors calibration means are provided which has a reference surface spaced at a specified distance from an immovably arranged workpiece or tool carrier, and wherein each of said control sensors is adapted to be brought up to said reference surface when being in the sensing position.

9. An NC machine tool as claimed in claim 8, wherein the reference surface is arranged in the proximity of said spindle axis.

* * * * *